United States Patent [19]

Combs

[11] Patent Number: 4,917,322
[45] Date of Patent: Apr. 17, 1990

[54] BARBED WIRE CADDY

[76] Inventor: Linsey L. Combs, Rte. 4, Box 185, Holdenville, Okla. 74848

[21] Appl. No.: 331,740

[22] Filed: Apr. 3, 1989

[51] Int. Cl.[4] .................................... B65H 75/40
[52] U.S. Cl. .................... 242/86.5 R; 242/94
[58] Field of Search ............ 242/86.5 R, 94, 115, 242/118.62, 129; 403/100, 102; 301/9.5; 254/129, 130, 284, 288, 324, 325, 326, 327, 329, 332, 413, 415

[56] References Cited

U.S. PATENT DOCUMENTS

| | | | |
|---|---|---|---|
| 388,383 | 8/1888 | Wilson et al. | 242/86.5 R |
| 460,894 | 10/1891 | Smith | 242/94 |
| 465,281 | 12/1891 | Meyer | 242/86.5 R |
| 1,230,794 | 6/1917 | Schick | 242/86.5 R |
| 2,023,353 | 12/1935 | Backe | 301/9.5 |
| 2,140,676 | 12/1938 | Hohner | 242/94 |
| 2,664,253 | 12/1953 | Therrien | 242/86.5 R |
| 2,895,757 | 7/1959 | Kaspar | 403/100 |
| 2,912,183 | 11/1959 | Hull | 242/86.5 R |
| 2,917,253 | 12/1959 | Way | 242/94 |
| 3,820,733 | 6/1974 | Reederer | 242/94 |

Primary Examiner—Donald Watkins
Attorney, Agent, or Firm—Richard F. Bojanowski

[57] ABSTRACT

A cart for spools of wire for transport or dispensing in which the main rigid "U"-shaped handle has an integral lockable hinge on one leg that can be unlocked to enable the leg to be swung away and thereby permit the wheels and wire spool to be removed. The wheels also preferably contain angled spokes to minimize entaglement of the wire during paying.

7 Claims, 2 Drawing Sheets

BARBED WIRE CADDY

BACKGROUND OF THE INVENTION

This invention relates to wheeled devices for carrying spools of wire, such as barbed wire and for maintaining, transporting and unreeling wire therefrom. More particularly, it provides a rugged, but simple, cart adapted for quick spool changes and facilitates the means by which barbed wire may be dispensed.

There are many carts or stands available for transporting spools of wire and for dispensing wire therefrom, but most are cumbersome and require several tools and considerable effort to load and remove the wire spools. In other cases, the wheels are fixed to the hub and in close proximity to the wire spools. As a result, there is a tendency for the barbed wire to become entangled with the rotating wheels during paying.

Devices for dispensing barbed wire have been in use for many years. Examples of more recent designs can be found in U.S. Pat. Nos. 3,009,667, 3,680,807 and 3,820,733. Some of the older designs are disclosed in U.S. Pat. Nos. 2,029,953 and 2,140,676.

BRIEF DESCRIPTION OF THE INVENTION

It is a primary object of this invention to provide a rugged cart for transporting a spool of barbed wire for the purpose of unwinding and stringing wire therefrom. Another object is to provide a cart which is rugged yet simple of construction and is so designed that no tools are needed to change wire spools or ready the unit for use. Still another object of this invention is to provide a freewheeling wire dispensing device wherein entanglement of the barbed wire with the rotating wheels is minimized, if not avoided.

The invention comprises a "U"-shaped handle desirably of strong steel tubing. The free ends of the handle terminate in bearings axially aligned with each other and spaced to include there between a pair of spaced apart wheels. An axle of predetermined length extends through and between both bearings and wheels. The axle is adapted to receive a standard spool of barbed wire in between the two wheels. One end of the axle has a slap collar or thrust shoulder thereon to retain it outside its associated bearing. The other end of the axle has a removable stop member, such as a washer, which is held in place by means of a cotter pin inserted through an opening bored outside the other bearing. Thus, when the wheels are in place and a spool is placed on the axle between the two wheels, the whole assembly is secured by the single pin.

For installation or changing wire spools, the side of the hinged handle and its bearing having the cotter pin is pulled away from the wheel and the axle and moved vertically along a hinged axis. This provides a clear path for the axial removal of one wheel and the spool. In accordance with the invention this is accomplished by providing a hinge on one handle leg which, when unlocked, permits one leg of the handle and the bearing fixed thereto to swing in a plane transverse to the axle. The hinge is located on the leg at a distance from the bearing sufficient to provide unhindered axial removal of the wheel and the spool when the leg is swung away at the hinge.

To ready the leg for swinging, the hinge on the handle is unloaded. The bearing is freed for axial withdrawal by removal of the pin and withdrawn a few inches. The leg is swung out of the way and the wheel and spool removed. For reassembly, the procedure is reversed.

The wheels are adapted with angled spokes extending alternately from the sides of the wheel to the outer ends of the bearing.

In order for the invention to be more readily understood and carried into effect, reference is made to the accompanying drawings and description thereof which are offered for explanation only, rather than in limitation. The scope of the invention is intended to be determined by the appended claims, including equivalents embraced therein, rather than by any mere description.

DETAILED DESCRIPTION OF THE DRAWINGS

DETAILED DESCRIPTION OF THE INVENTION

Figure 1:
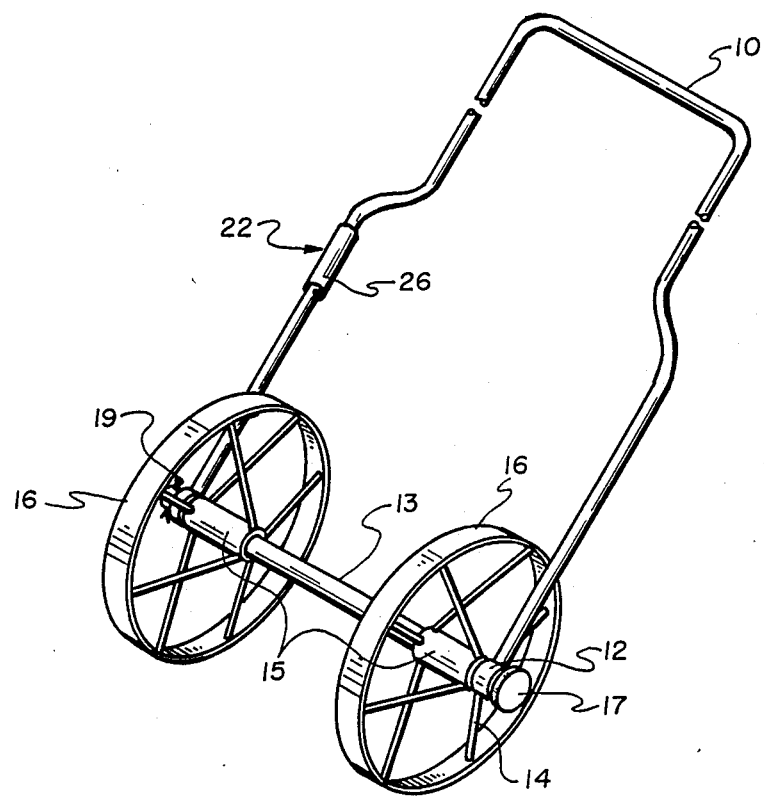
FIG. 1 is a perspective view of a preferred embodiment of the invention.
Figure 2:
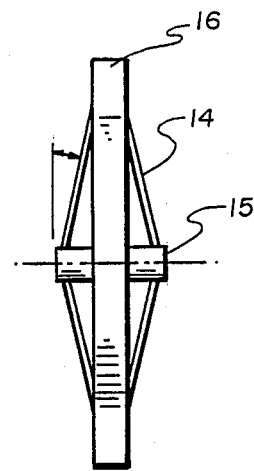
FIG. 2 is an elevational view of one of the wheels of the cart.
Figure 3:
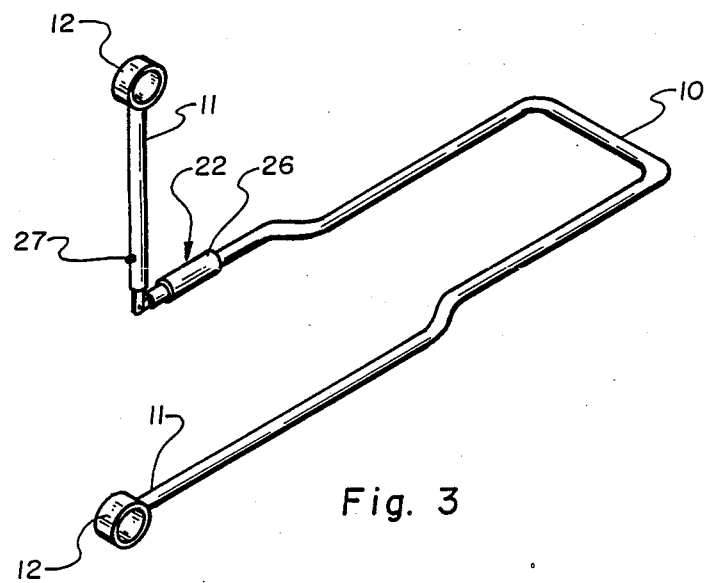
FIG. 3 is a perspective view of the handle of the cart.
Figure 5:
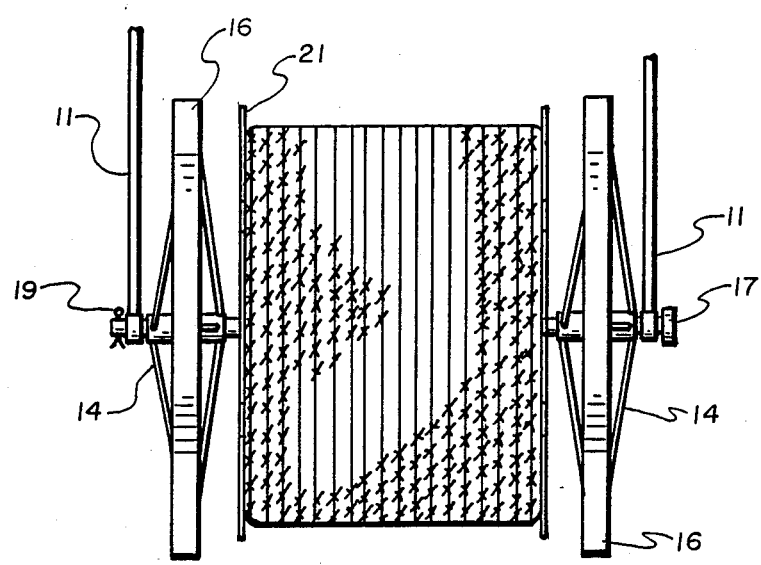
FIG. 5 is a partial elevational view of the cart with a spool of wire installed.
Figure 4:
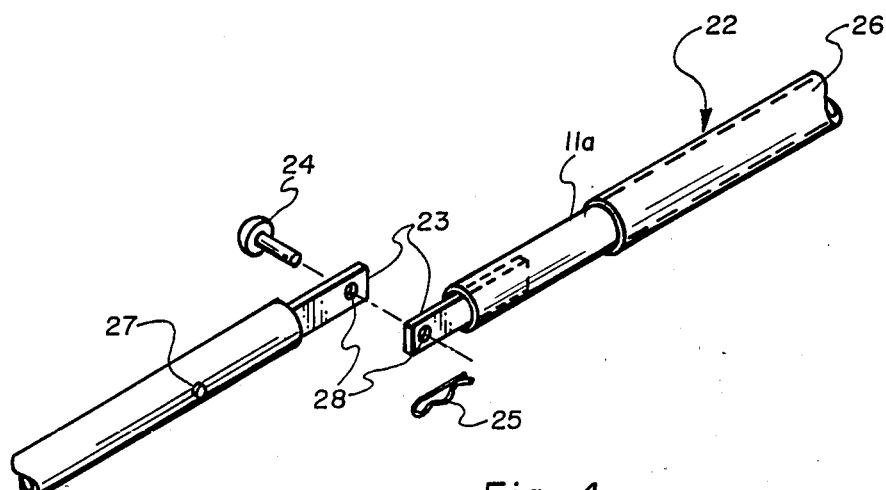
FIG. 4 is an enlarged perspective view showing details of the hinge and lock on the handle.

The cart comprises a "U"-shaped handle 10. The free ends 11 of which each is provided with a simple cylindrical bearing 12. The bearings are fixed to the handle in such a manner that when the unit is assembled for operation, as in Figs. 1 and 5, the bearings are in spaced apart axial alignment. An axle 13 of sufficient length extends through and beyond both of the spaced apart bearings 12.

Wheels 16 are provided which include centrally positioned sleeves or hubs 15. The hubs are journaled for free rotation on the axle shaft and are of a length sufficient to receive a plurality of angled radial spokes 14.

With this arrangement, each of the wheels are independently free-wheeling about axle 13. The angled radial spokes extend and are fixed alternately to the outer ends of hubs 15 and the inner wall of the wheel 16. The spokes are at an angle from vertical of between about 8° and 16° and preferably about 12°. This angle maximizes wheel stability and minimizes entanglement of the barbed wire with the wheel during paying.

As is usual, in this type of arrangement, one end of the axle 13 is provided with a shoulder 17 and the other end of the axle has a drilled hole (not shown) therethrough to accept a pin such as a cotter pin 19. Alternatively, a snap ring and groove could be used on one or both ends of the axle.

Also as usual, a wire spool 21 is included on the axle between the wheel. The wire spool is capable of unhindered rotation about the axle and thereby must possess a maximum diameter with wire that is less than the diameter of the cart wheels 14. The spool will fit loosely on the axle and thereby can be freewheeling.

A hinge assembly, generally shown by the number 22, is built as an integral part of one leg 11(a) of the handle at a distance from the bearing greater than the radius of the wheel 14. At the hinge, the leg is in two parts. The hinge comprises a complemental axial rigid piece 23 secured to each of the two parts. Each piece is drilled to provide an opening 28 and a removable pin 24 passes through the opening to provide a pivotal connection between the two leg parts. The removable pin 24 and the rigid pieces 23 are connectably secured by a cotter pin 25.

The rigid pieces extend co-axially of the leg parts and the removable pin is substantially parallel to the axle when the cart is assembled. Thus, once disconnected from the axle, the leg will pivot in a plane transverse to the axle.

To lock the hinge and thus render the handle rigid, a concentric sleeve 26 is slidably mounted on the outside of the handle 11(a) to slide down over the rigid pieces 23. A pin or screw head 27 limits downward movement of the locking sleeve.

As indicated above, the wheels 16 are built with hub portions 15 that are of axial extent greater than the outer wall width of the wheels 16. These axially elongated hubs are connected by angled, radially extending spokes to the inner wall of the wheel. The hub and angled spokes separate the central axis area of the spool thus assisting in maintaining the spool in a more nearly centered position and minimizing, if not avoiding, the entanglement or interference of the barbed wire with the wheel or its spokes during paying.

I claim:

1. A cart for transporting spools of wire and for dispensing same comprising a "U"-shaped handle, having two legs with the free ends, said free ends are spaced apart and are each provided with a bearing axially aligned with the other, an axle extending through both said bearings, said axle having a stop member fixed to one end thereof, a pair of wheels on said axle between said bearings, retaining means for detachably retaining said bearings and wheels on said axle, and a lockable hinge on one of said legs enabling the selective swinging of said free end of one of said legs in a plane transverse to said axle, said hinge being located a distance from the bearing on the free end of one of said legs wherein said distance is greater than the radius of said wheels.

2. The cart according to claim 1 in which said hinge comprises a construction wherein said leg is in two pieces at said hinge said two pieces are pivotally connected together by a pin that is substantially parallel to said axle, and a hinge lock means for locking the two parts of said legs in rigid axial alignment comprising a slidable sleeve fitted concentrically about said leg piece farthest from said bearing and adapted to slide over said pivotal connection into simultaneous concentric fit with both pieces of said leg.

3. A cart according to claim 1 in which said retaining means for retaining said axle in position in said bearings comprises in combination an enlarged shoulder at one end of said axle of diameter greater than said bearings and a detachable retaining means at the opposite end of said axle which blocks said axle from sliding axially through said bearing.

4. A cart according to either claim 1 or claim 2 in which said wheels have circular inner and outer walls and hubs which possess an axial length greater than the width of said wheels inner and outer walls.

5. A cart according to claim 4 including alternately angled spokes connected to the ends of said hubs and the inner walls of said wheels.

6. A cart according to claim 5 wherein said spokes are angled at between about 8° and 16° with respect to the wheels' vertical plane.

7. A cart according to claim 5 wherein said spokes are angled at about 12° with respect to a vertical plane passing transversely through said wheels.

* * * * *